(12) United States Patent
Fulkerson et al.

(10) Patent No.: US 8,245,064 B2
(45) Date of Patent: Aug. 14, 2012

(54) POWER CONSERVATION DURING A POWER MODE TRANSITION

(75) Inventors: Christopher Ryan Fulkerson, Longmont, CO (US); Abhay Tejmal Kataria, Longmont, CO (US); Jason Dale Gregg, Longmont, CO (US)

(73) Assignee: Seagate Technology LLC, Cupertino, CA (US)

( * ) Notice: Subject to any disclaimer, the term of this patent is extended or adjusted under 35 U.S.C. 154(b) by 530 days.

(21) Appl. No.: 12/485,110

(22) Filed: Jun. 16, 2009

(65) Prior Publication Data

US 2010/0318825 A1 Dec. 16, 2010

(51) Int. Cl.
*G06F 1/32* (2006.01)
(52) U.S. Cl. .................... 713/323; 713/300
(58) Field of Classification Search ............ 713/300, 713/323
See application file for complete search history.

(56) References Cited

U.S. PATENT DOCUMENTS

| | | | |
|---|---|---|---|
| 5,442,608 A * | 8/1995 | Umeda et al. ............. | 369/44.27 |
| 5,657,179 A | 8/1997 | McKenzie | |
| 5,668,680 A | 9/1997 | Tremaine | |
| 6,031,684 A | 2/2000 | Gregg | |
| 6,097,679 A * | 8/2000 | Ohtaki ................. | 369/47.11 |
| 6,169,382 B1 | 1/2001 | McKenzie et al. | |
| 6,178,060 B1 | 1/2001 | Liu | |
| 6,449,117 B1 | 9/2002 | Waugh | |
| 6,545,838 B1 | 4/2003 | Burton | |
| 6,563,666 B1 | 5/2003 | LaPanse | |
| 6,574,070 B2 | 6/2003 | Gregg | |
| 6,850,386 B2 | 2/2005 | Kovinskaya et al. | |
| 7,031,100 B2 | 4/2006 | Andress et al. | |
| 7,075,744 B2 | 7/2006 | Cumpson et al. | |
| 7,330,329 B2 | 2/2008 | Jun | |
| 7,355,940 B2 * | 4/2008 | Yonezawa ............... | 369/47.42 |
| 7,602,570 B2 * | 10/2009 | De Boer ................. | 360/73.01 |
| 7,882,378 B2 * | 2/2011 | Igari ....................... | 713/320 |
| 7,986,483 B1 * | 7/2011 | Susanto et al. .......... | 360/73.03 |
| 2003/0156345 A1 * | 8/2003 | Fayeulle et al. ......... | 360/73.03 |
| 2005/0144491 A1 * | 6/2005 | Zayas ....................... | 713/300 |
| 2006/0288240 A1 | 12/2006 | Kardach | |
| 2008/0133951 A1 | 6/2008 | Igari | |

* cited by examiner

*Primary Examiner* — Nitin Patel
(74) *Attorney, Agent, or Firm* — Mitchell K. McCarthy; McCarthy Law Group (57) ABSTRACT

An apparatus and associated method to begin performing a power reduction enablement sequence based on a first predetermined value of elapsed time after an execution of a data access command is completed. The power reduction enablement sequence is performed at an adaptively selected rate that is related to a second predetermined value of elapsed time after the execution that calls for a switch to a reduced power mode for the apparatus.

20 Claims, 6 Drawing Sheets

POWER CONSERVATION DURING A POWER MODE TRANSITION

FIELD

The present embodiments relate to power conservation during a power mode transition in an electronic device and more particularly, but without limitation, to coordinating the execution of a power reduction enablement sequence during a reduced power mode event to conserve power.

BACKGROUND

Processor based electronics have proliferated into virtually all types of consumer electronics devices. Many such devices are necessarily portable, so battery life performance becomes an important brand distinguishing value. To conserve power, many devices are equipped with circuitry that changes between various different power modes.

Typically, a device switches between different power modes based on what resources are necessary to sustain usage of the device. For example, circuitry that functions only to communicate externally, such as for transferring data with an external device, may actually only seldom be utilized. Powering that circuitry all the time would waste battery power, and hence needlessly reduce the effective life of the battery for portable operation of the device.

Consideration must also be paid to ensure that short-cycling penalties are not created when switching between power modes. Some power-intensive circuits and some components, such as motors, can actually consume more power in turning them off for only a short time and then restarting them, in comparison to just leaving them on.

The market has and will continue to demand even more powerful electronics that are available for longer portable sessions running on battery power. It is to improvements in the art of power conservation that the present embodiments are so directed.

SUMMARY OF THE INVENTION

In some embodiments an apparatus is provided having power management logic to begin performing a power reduction enablement sequence on the apparatus based on a first predetermined value of elapsed time after an execution of a data access command is completed. The power management logic performs the power reduction enablement sequence at an adaptively selected rate that is related to a second predetermined value of elapsed time after the execution that calls for a switch to a reduced power mode for the apparatus.

In some embodiments an apparatus is provided having command queue logic to control issuance of data access commands to a storage space via a data transfer member disposed in a data transfer relationship with the storage space. The apparatus also has power management logic to begin moving the data transfer member toward a parked location based on a first predetermined value of elapsed time after execution of a data access command. The power management logic continues to move the data transfer member at an adaptively selected velocity that is related to a second predetermined value of elapsed time after the execution that is associated with a call for a switch to a reduced power mode for the apparatus.

In some embodiments a method is provided that includes the step of monitoring an elapsed time after execution of a data access command in an apparatus. When an elapsed time after the execution is greater than a first predetermined threshold, the method further includes executing programming instructions stored in a computer readable memory to begin performing a power reduction enablement sequence in the apparatus at an adaptively selected rate that is associated with a second predetermined threshold of elapsed time after the execution. When an elapsed time is greater than the second predetermined threshold, the method further includes executing the instructions to switch to a reduced power mode for the apparatus.

DETAILED DESCRIPTION

The present embodiments generally contemplate an apparatus and associated method for coordinating the steps of a power reduction enablement sequence for a device with a call for a reduced power mode for the device. The term "reduced power consumption mode" in this description and claims means that the device has the capability of partially or completely shutting down electrical circuitry and/or components in order to reduce power consumption. In the illustrative description that follows the Advanced Power Modes (APM) specification is referred to, and particularly with reference to its performance idle mode and reduced-power idle1 mode, although the claimed embodiments are not so limited.

The term "power reduction enablement sequence" in this description and claims means an ordered set of steps that the device performs by executing software or hardware instructions to perform a task in preparation for switching to a reduced power mode. For example, in the description that follows a data storage device physically moves components before shutting down other components, although the claimed embodiments are not so limited. The claimed embodiments contemplate performing the power reduction enablement sequence at an adaptively selected rate to conserve power. For the illustrative embodiments below, the selected rate depends on how far the components are moved and what interval of time is chosen for moving them.

Figure 1:
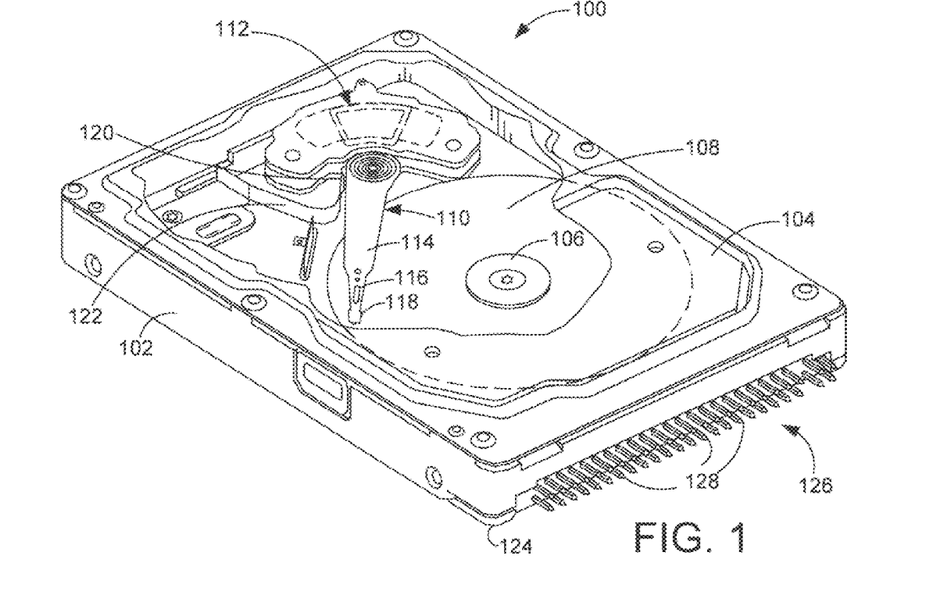
FIG. 1 depicts an isometric depiction of a data storage device that is constructed in accordance with embodiments of the present invention.

FIG. 1 is an isometric depiction of a data storage device 100 that is constructed in accordance with embodiments of the present invention. It will be understood, however, that the embodiments of the present invention are not so limited to a disc drive, because the skilled artisan will understand that the inventive embodiments described and claimed herein generally encompass other devices as well that perform power reduction enablement sequences in conjunction with switching to various different power modes. An enumeration of all such devices is not necessary for the skilled artisan to understand the scope of the claimed embodiments.

The device 100 preferably includes a base 102 and a cover 104 (partially cutaway), which together provide a housing for a number of components. The components include a motor 106 to which is fixed one or more storage mediums 108 that are fixed in rotation therewith, and that define a storage space. Adjacent the storage medium 108 is an actuator assembly 110 that pivots around a bearing assembly through application of current to a voice coil motor (VCM) 112. In this way, controlled operation of the VCM 112 causes the actuator 110 to move radially across the storage medium 108.

The actuator assembly 110 includes an actuator arm 114 having a load arm 116 that, in turn, supports a head 118 (or "transducer" or "data transfer member") at a distal end thereof in an operable data transfer relationship with the adjacent storage medium 108. Each storage medium 108 can be divided into data tracks, and the head 118 is positionable to retrieve data from and store data to the tracks.

To provide the requisite electrical conduction paths between the head 118 and device control circuitry, the head 118 advantageously is connected to a flex circuit that is routed on the actuator assembly 110 from the head 118, along the load arm assembly 116 and the actuator arm 114, and to a preamplifier circuit 120 that is supported by a proximal end (sometimes referred to as "E block") of the actuator assembly 110. The preamplifier circuit 120 connects the flex circuit to another flex circuit 122 which passes through the base 102 to a printed circuit board (PCB) 124. An electrical connector 126 attached to the PCB 124 has a plurality of contacts 128 for connecting the device 100 to a mating connector (not shown) for placing the device 100 in communication with external circuitry, such as a remote host device.

Figure 2:
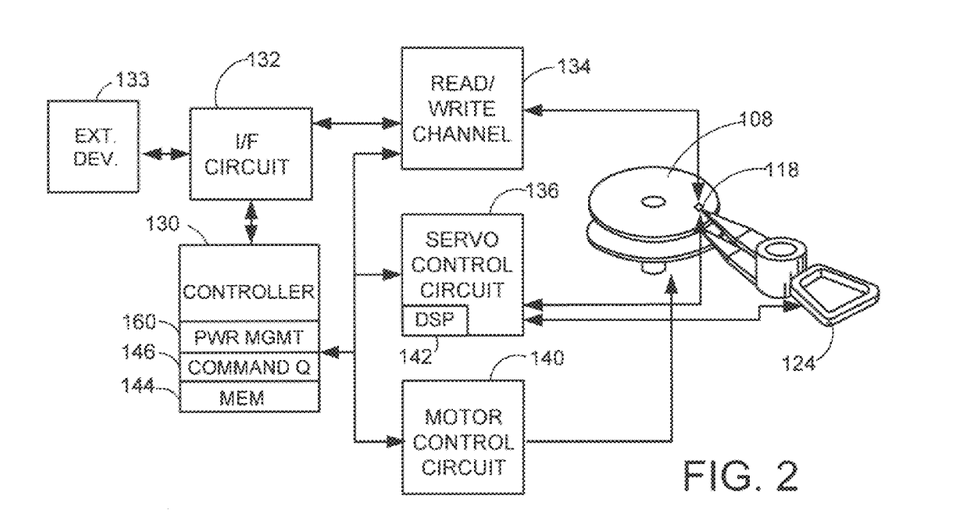
FIG. 2 depicts a functional block diagram of the data storage device of FIG. 1.

FIG. 2 depicts a functional block diagram of the device 100 of FIG. 1. A programmable controller 130 provides top-level communications and control for the device 100. An interface (I/F) 132 facilitates input and output (I/O) communications and transfers to an external device 133 with which the device 100 can be associated. A read/write (R/W) channel 134 conditions data to be written to the storage medium 108 during a data store operation, and reconstructs data retrieved from the storage medium 108 for transfer to the external device 133 during a data retrieve operation.

A servo control circuit 136 provides positional control for the heads 118, such as by using servo data stored to the storage medium 108. The servo control circuit 136 is preferably configured to carry out a number of control functions including track following operations whereby a selected head 118 follows a corresponding track on the storage medium 108, seek operations whereby a selected head 118 is moved from an initial track to a destination track or to a parked location, and head 118 load/unload operations whereby the heads 118 are moved away/to a parking zone or a parking structure. The servo control circuit 136 applies the requisite currents to a coil 138 of the VCM 112 to selectively move the heads 118 in relation to the tracks of the storage medium 108.

The system further preferably includes a motor control circuit 140 to control the motor 106. Processing requirements to carry out these and other servo functions are preferably supplied by a digital signal processor (DSP) 142 or other processing device of the servo control circuit 136, such as an ARM. The servo processing can alternatively be supplied by the top level controller 130 in a single processor environment.

Preferably, in order to increase host processing performance, write commands are write-back cached in a cache memory 144. Command queue logic 146 residing in the controller 130 prioritizes and places the write commands and higher priority read commands, collectively referred to as "data access commands," within a command queue. The command queue logic 146 also controls issuance of the data access commands from the command queue to the storage space via the operable data transfer relationship between the head 118 and the disc 108.

Figure 3:
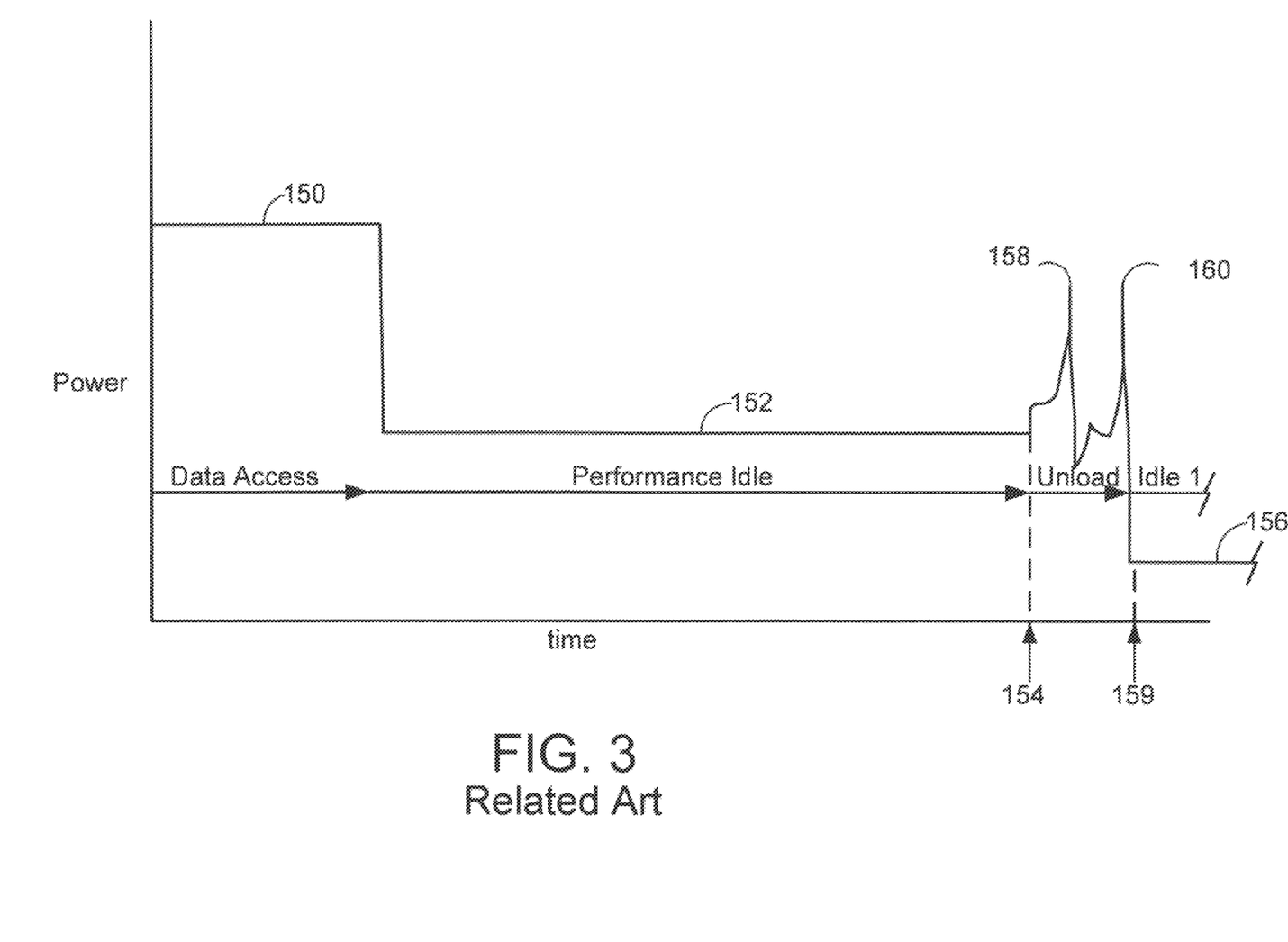
FIG. 3 depicts a power trace during operation of a data storage device that is constructed in accordance with related art.

FIG. 3 depicts a power trace in a similar data storage device, but one that is constructed in accordance with related art solutions. The trace begins at an elevated power level 150 during the time that an issued data access command is being executed. When execution of the data access command is completed, the power level is switched to a performance idle mode 152. The device remains in performance idle mode 152 for a predetermined interval defined by the time denoted by the reference number 154, which is referred to herein as the idle1 delay interval. If another access command is issued during the idle1 delay interval, then the device remains sufficiently powered to respond immediately.

If the idle1 delay interval lapses without another data access command issuing, then the absence of a sequential command is taken to be a prediction that power savings can be had by further reducing power by switching to the idle1 mode 156. However, some steps need to be taken in order to enable the device 100 to switch to idle1 mode 156. These steps are referred to herein as a "reduced power enablement sequence."

For example, in the device 100 the idle1 mode 156 is possible in part by shutting down the motor 106, which consequently stops the spinning of the disc 108. In that case the reduced power enablement sequence includes moving the head 118 to a designated parked location before stopping the disc 108 rotation, to prevent possibly damaging physical contact between the head 118 and the disc 108. The parked location can a landing zone on the disc 108 or a load/unload ramp adjacent the disc 108. In some embodiments the actuator 110 is moved to and then abuttingly biased against a crash stop to positively locate the head 118 at the parked location, whether in a landing zone or on a ramp.

At the end of the idle1 delay interval, meaning at the time denoted by reference number 154, the device 100 calls for a switch to idle1 mode 156. However, the switch to idle1 mode 156 is necessarily delayed during execution of the reduced power enablement sequence, depicted as the unload interval in FIG. 3 from time 154 to the time denoted as reference number 159. A first power spike 158 occurs as a result of energizing the actuator coil 138 to accelerate the actuator 110 to a desired velocity with which it moves the head 118 toward the parked location. When the desired velocity is reached, the power consumption drops because it takes significantly less power to keep the actuator 110 moving at the desired velocity. A subsequent power spike 160 occurs as a result of again energizing the actuator coil 138 but this time with a reverse polarity to decelerate the actuator 110 from the desired velocity as the head 118 approaches and ultimately reaches the parked location.

After the head 118 reaches the parked location, the reduced power enablement sequence is completed so the device 100 can switch to the idle1 mode 156. Note that in this related art solution the actuator 110 is moved quickly to the parked location in order to minimize the duration of the unload interval, but doing so can be problematic because of the amount of power expended and because the abrupt accelerations and decelerations can create undesired noise.

Figure 4:
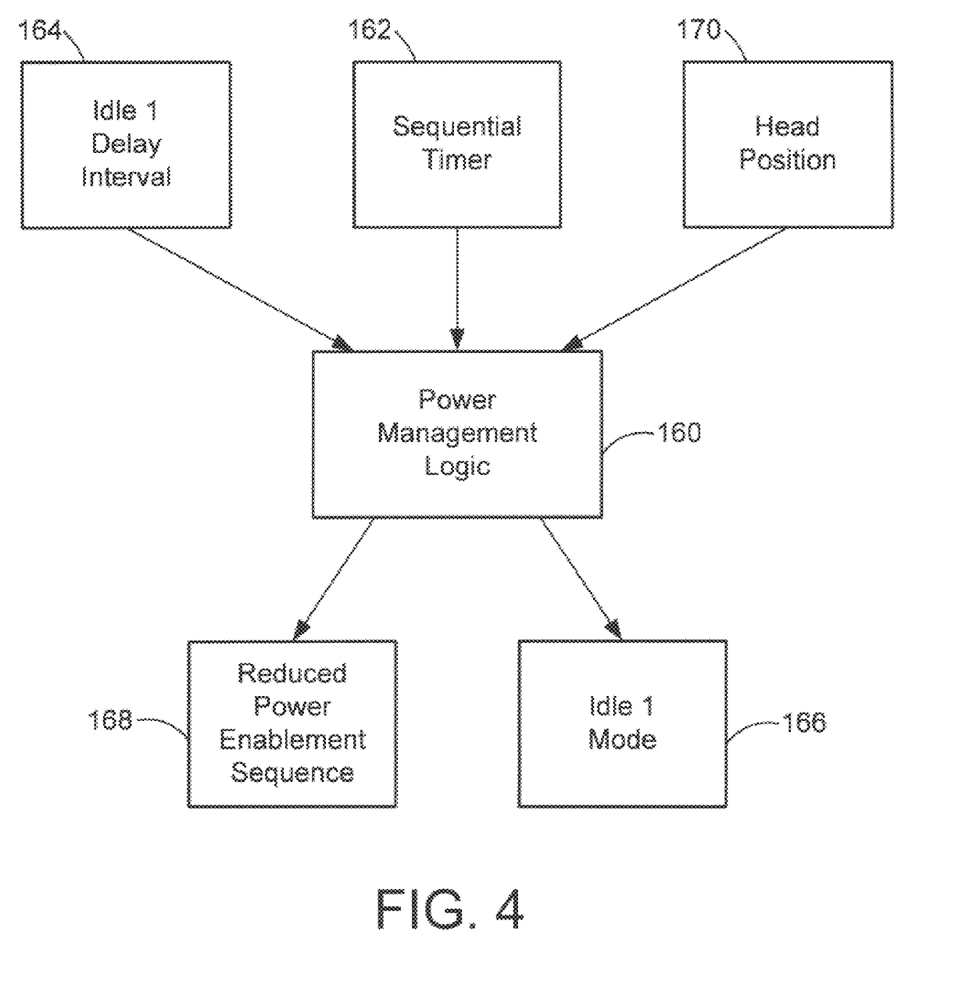
FIG. 4 depicts a functional block diagram of the data storage device of FIG. 1.

Returning momentarily to FIG. 2, also residing in the controller 130 in the present embodiments is power management logic 160 that calls for both the reduced power enablement sequence and the reduced-power idle1 mode 156. FIG. 4 is a functional block diagram showing the power management logic 160 receives an input signal from a sequential timer 162 that resets at the completion of the most recently executed data access command, when the power level returns to the performance idle mode 152 (FIG. 3). This begins the idle1 delay interval. The power management logic 160 also receives an idle1 delay interval signal 164 informing it of how long the idle1 delay interval is. The idle1 delay interval can be a fixed interval, or it can be adaptively derived to different drive states. For example, the idle1 delay interval may be adapted to processing different types of data, such as sequential data versus random data, or it may be set differently under different data throughput loads. In any event, resetting the sequential timer 162 triggers the power management logic 160 to call for the reduced power enablement sequence 168.

Figure 5:
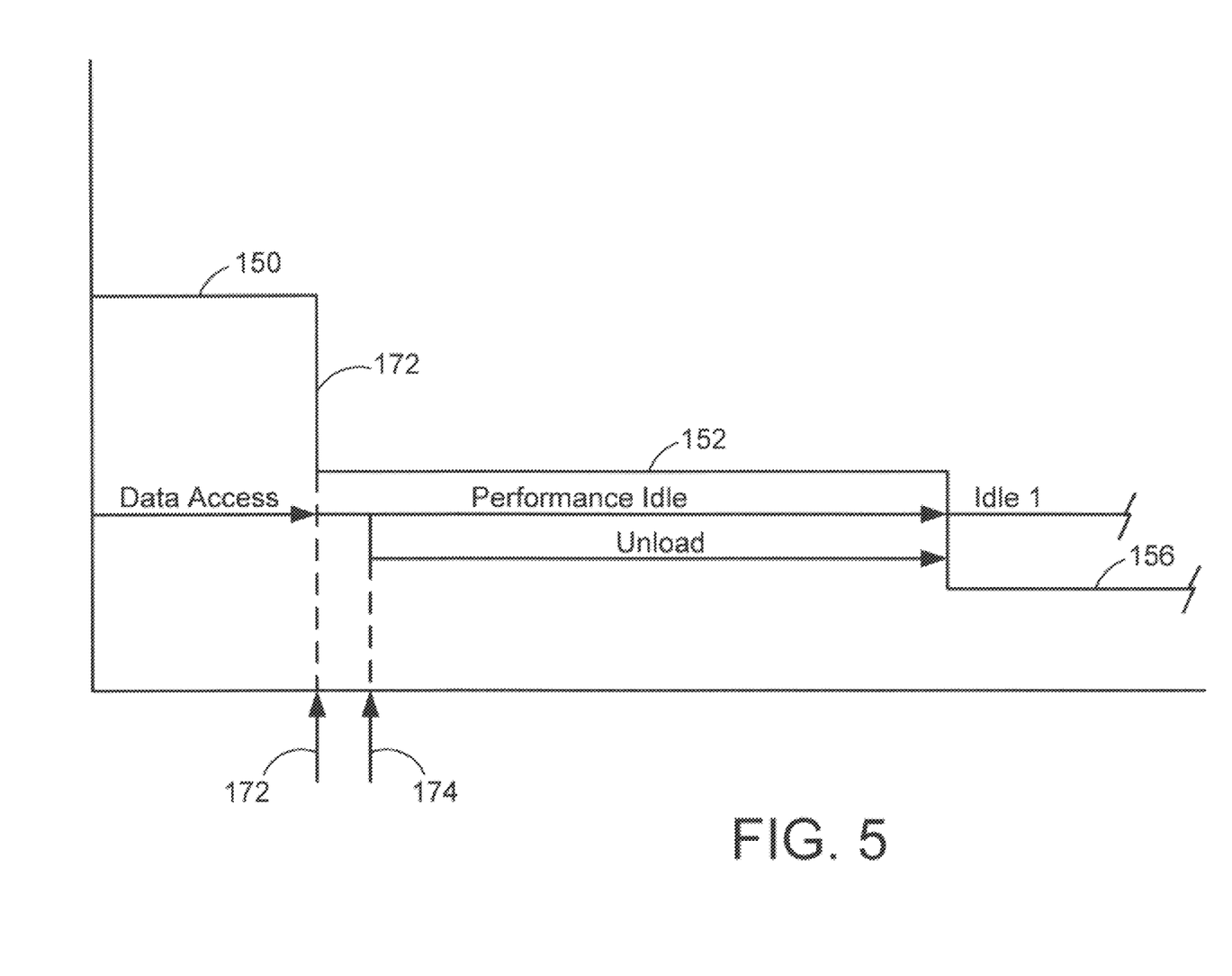
FIG. 5 depicts a power trace during operation of the data storage device of FIG. 1.

FIG. 5 depicts another power trace, one of the device of FIG. 1 that is constructed in accordance with the present embodiments. Generally, the present embodiments perform a slow (low power) seek toward the parked location during the idle1 delay interval to provide an instantaneous drop to idle1 mode 156 at the end of the idle1 delay interval. To do so, a head position signal 170 (FIG. 4) is obtained from the servo control circuit 136 (FIG. 2). The head position signal 170 can be obtained contemporaneously with the resetting of the sequential timer 162, such as at time 172 depicted in FIG. 5. However, if the idle1 delay interval is long enough to permit, then preferably the power management logic 160 invokes a delay before starting the slow seek, such as depicted at time 174 in FIG. 5. Such a delay improves the prediction as to where the head 118 might be needed should the slow seek be interrupted by another data access command being issued before the end of the idle1 delay interval. That is, if after a short delay another data access command is not issued for the same track as for the most recent data access command, then the likelihood that the head 118 will be needed at that same track to service the next data access command is significantly lessened. The amount of delay depends ultimately on what margin is available in fitting the slow seek within the idle1 delay interval, but in reducing the present embodiments to practice it was observed that a 10 millisecond (ms) delay in a 100 ms idle1 delay interval significantly reduced the likelihood that beginning the slow seek resulted in having to seek back to the track associated with the previous data access command before the idle1 delay interval completed.

The power management logic 160 uses the instantaneous head position signal 170 after the selected delay, if any, and the length of the idle delay interval to adaptively define a low velocity, and hence low power and low noise, seek to move the head 118 to the parked location. Recall that the sequential timer 162 resets at the completion of the execution of the most recent data access command, where the power level drops to performance idle mode 152. The resetting of the sequential timer 162 triggers the power management logic 160 to ascertain the position of the head 118 via the head position signal 170. Given the corresponding distance necessary to traverse in order to reach the parked location, measurable for instance in terms of number of tracks to travel, and knowing how long the idle1 delay interval is, the power management logic 160 then adaptively selects a characteristic slow seek with which to move the actuator 110.

Preferably, the head 118 reaches the parked location before the call for reduced-power idle1 mode 156 occurs, so the slowest possible seek velocity is ultimately limited by the length of the idle1 delay interval less the amount of delay in starting the slow seek after the resetting of the sequential timer 162. Otherwise, if the slow seek is not completed before the end of the idle1 delay interval then the switch to idle1 mode 156 will be delayed, as in the related art solutions depicted in FIG. 3. As mentioned previously, the length of the idle1 delay interval can be adaptively derived, and another reason for doing so can be so that in all cases an acceptable adaptively derived demand velocity is obtainable that completes the slow seek to the parked location in less time than the net idle1 delay interval.

Thus, generally speaking, the power management logic 160 of the present embodiments begins moving the head 118 toward the parked location based on a first predetermined value of an elapsed time of the sequential timer 162, such as at time 174 in FIG. 5. Importantly, it will be understood that this means the beginning of the unload sequence occurs during the idle1 delay interval, when the device 100 remains in the performance idle mode 152. Furthermore, the adaptively selected velocity with which the head 118 is moved during the slow seek is dependent in part on the instantaneous starting position of the head 118 at a time contemporaneous with the first predetermined value of the sequential timer 162. As discussed above, preferably the adaptively selected velocity moves the head 118 from the instantaneous starting position to the parked position before completion of the idle1 delay interval.

Spreading the slow seek out over most if not the entire idle1 delay interval advantageously keeps the head 118 in play within the disc 108 data storage space in the event another data access command issues from the command queue before the idle1 delay interval lapses. A model reference controlled seek is well suited for performing the slow seek because such an operation significantly reduces power and noise in comparison to a velocity controlled seek.

Figure 6:
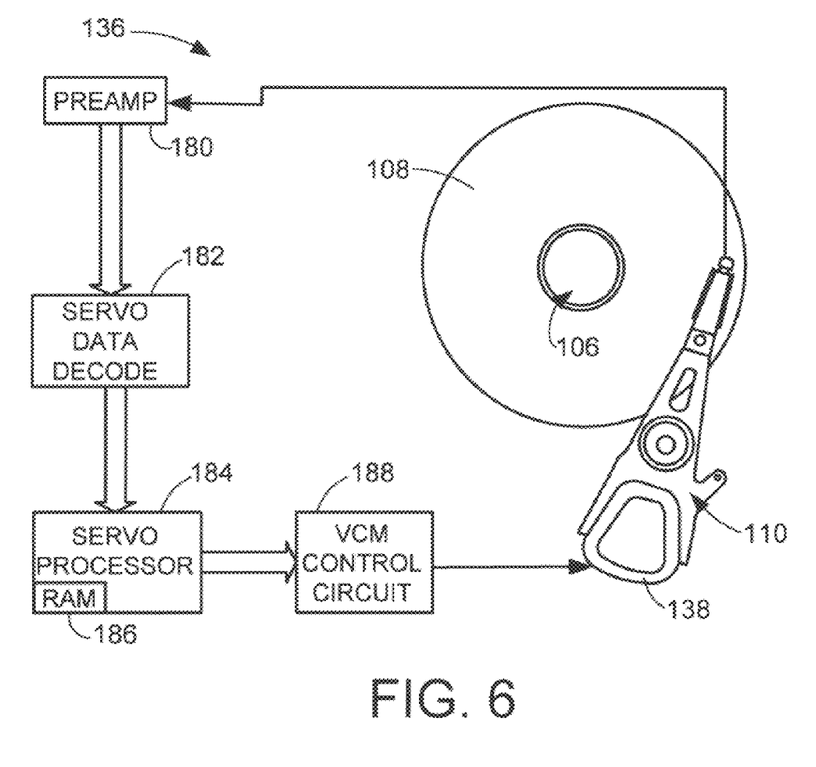
FIG. 6 is a functional block diagram of a servo control circuit used in performing model reference seeks in the data storage device of FIG. 1.

To that end, FIG. 6 depicts some more details of the servo control circuit 136 (FIG. 2) including a preamp circuit 180 that includes the preamplifier 120 (FIG. 1), a servo data decode circuit 182, a servo processor 184 with associated servo RAM 186 and a VCM control circuit 188, all of which cooperate to control the position of the head 118.

The servo processor 184 determines head position error from the relative magnitudes of the digital representations of the embedded servo sectors and, in accordance with commands received from the disc drive controller 130 (FIG. 2), determines the desired position of the head 118 with respect to the disc 108. In response, the servo processor 184 outputs a current command signal to the VCM control circuit 188, which includes an actuator driver that applies current of a selected magnitude and direction to the actuator coil 138.

The embedded servo sectors are typically written to the discs 108 using a highly precise servo track writer, either before or after the discs 108 are assembled into the device 100. The embedded servo sectors serve to define the boundaries of each of the tracks and are divided circumferentially into a number of frames, with user data fields disposed therebetween. Because the sampling rate of the servo frames is generally insufficient to adequately control the positioning of the head 118, a multi-rate observer can be employed to provide estimates of head position, velocity and bias force so that corrections can be made in the head positioning at times when the head 118 is operably adjacent the user data fields between each pair of successive servo frames.

A generalized control diagram for the servo circuit 136 is disclosed in U.S. Pat. No. 6,574,070 which is assigned to the assignee of this application and is incorporated by reference in its entirety herein. Ordered process steps for carrying out such a control system can be readily implemented through appropriate programming instructions that are stored in and executed by the servo processor 184.

Generally, the control system derives a model reference seek using a modified waveform, such as a modified one minus cosine (1−cos) reference current signal that is scaled to each particular seek length (i.e., the number of tracks in the seek). Such a reference current waveform, referred to herein as the current profile, includes both positive and negative current values to first accelerate and then decelerate the head 118 from the initial track to the parked location during the slow seek. However, the present embodiments are not limited to a particular current profile, in that a variety of different reference currents may be used for the model reference seek. A square or sawtooth waveform or a waveform that has been optimized under some constraint, such as for minimal excitation or for minimum jerk, are examples of different reference currents that may be used for the model reference seek.

A model reference generator can be encoded within the servo processor 184 that utilizes a current table, an encoded finite impulse response filter and a double integrator function. The current table generally includes a current profile with an associated set of empirically determined filter coefficients, also referred to as filter taps. The current profile represents an amplitude and direction of current, referred to herein as demand current, that is applied to the actuator coil 138 during execution of the slow seek. The double integrator is used to generate a velocity reference ("Vref") signal as the first integral of the current profile, and a position reference ("Xref") signal as the second integral of the current profile. Because the servo processor 184 can execute a double integration nearly instantaneously and provide a model reference position absent losses, the finite impulse response filter advantageously delays the effect of the double integrating function operating on the value of the demand current. The length of the delay is intended to model the expected time delay and losses that typically occur between application of demand current to the actuator coil 138 and the response of the voice coil 112 to position the head 118 to a predetermined position, at a predetermined velocity over a predetermined period of time.

At pre-selected intervals during the execution of the model reference seek, the head 118 reads position information from the embedded servo sectors. The servo processor 184 compares the actual position of the head 118 to the position reference generated by the model reference generator. The comparison serves as the basis for making corrections to the current command signal to bring the actual position of the head 118 into conformance with the reference position.

Figure 7:
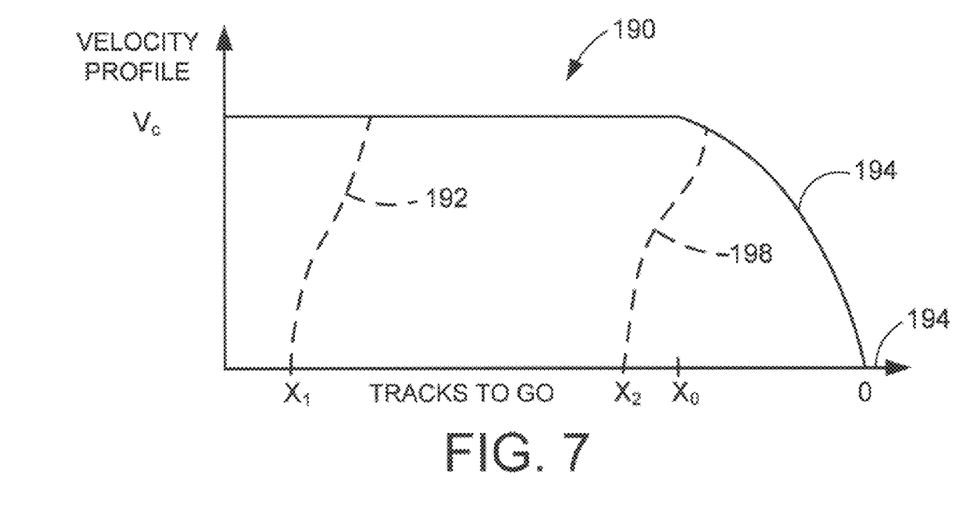
FIG. 7 depicts a velocity profile used by the data storage device of FIG. 1 in performing velocity controlled seeks.

Again, using a model reference seek to unload the head 118 is preferred because in comparison to voltage controlled seeks it advantageously reduces the expended power and generated noise associated with performing the slow seek. The present embodiments are not so limited, however, in that in alternative embodiments a velocity controlled seek can be used. In that case a velocity profile 190 such as is depicted in FIG. 7 is stored and used by a closed loop control system executed by the servo control circuit 136 (FIG. 2) to match the demand velocity to that defined by the velocity profile 190 for each of a plurality of different starting positions. For example, if the slow seek begins at track designated as $X_1$ then the control system imparts a demand velocity to accelerate the head 118 along the acceleration path 192 until the desired constant velocity $V_C$ is reached. At that point, generally less power is necessary to maintain the head 118 moving at $V_C$ than the power required by the acceleration. The control system ultimately decelerates the head 118 beginning at the track designated as $X_0$ according to the deceleration path 194 until the head 118 comes to rest with zero tracks left to go before reaching the parked location 196. If the slow seek begins with the head 118 adjacent to the track denoted as $X_2$ then the head 118 is accelerated according to the path 198 which intersects the deceleration path 194 instead of the constant velocity $V_C$.

It is noted that the depicted track designations are entirely intended to reference preselected relative track positions with respect to the parked location 196, and are not intended in any way to be associated with track addresses. It is also noted that the skilled artisan understands that the designation of zero tracks to go in some embodiments can mean that the head 118 has arrived at an unload ramp that extends beyond the data storage space, and that additional power not depicted by the velocity profile 190 would then be necessary to move the head 118 beyond the last track and onto the ramp.

Figure 8:
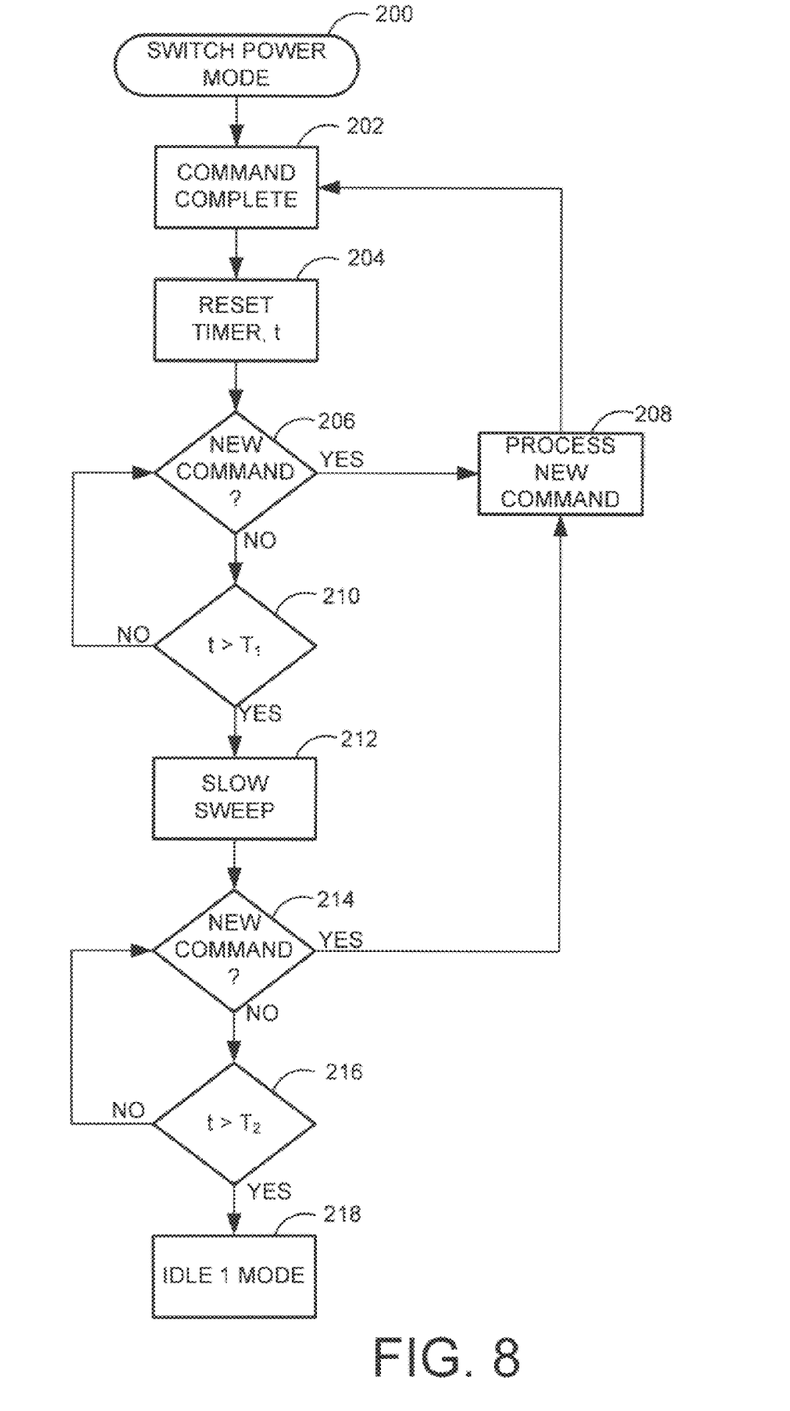
FIG. 8 depicts steps for practicing a method for SWITCHING POWER MODE in accordance with embodiments of the present invention.

With the foregoing description in mind, attention now is directed to FIG. 8 which depicts a flowchart of steps that are carried out in accordance with a method 200 for switching power modes in accordance with embodiments of the present invention. The method 200 begins in block 202 with the observation that execution of the most recently issued data access command is complete. Control then passes to block 204 which resets the sequential timer 162. In block 206 it is determined whether another data access command has been issued from the command queue. If the determination of block 206 is yes, then processing of that next data access command occurs in block 208 and then control returns to block 202. If the determination of block 206 is no, then control passes to block 210 where it is determined whether the sequential timer 162 has elapsed to a first predetermined threshold, $T_1$, that is predetermined to be the starting time (such as 174 in FIG. 5) for beginning the slow sweep.

If the determination of block 210 is no, then control returns to block 206, otherwise the slow sweep begins in block 212. During the slow sweep it is determined in block 214 whether another data access command is issued from the command queue. As in block 206, if the determination of block 214 is yes then control returns to block 208 and ultimately back to block 202. If the determination of block 214 is no, then control passes to block 216 where it is determined whether the sequential timer 162 has elapsed to a second predetermined threshold, $T_2$, that defines the idle1 delay interval. If the determination of block 216 is no the control returns to block 214, otherwise the switch is made in block 218 to idle1 mode 156.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary in type or arrangement without departing from the spirit and scope of the present invention.

In addition, although the embodiments described herein are directed to illustrative embodiments describing a disc drive data storage device, it will be appreciated by those skilled in the art that the claimed subject matter is not so limited and various other systems and other devices within systems can utilize the present embodiments without departing from the spirit and scope of the claimed invention.

What is claimed:

1. An apparatus comprising power management logic to begin performing a power reduction enablement sequence on the apparatus based on a first predetermined value of elapsed time after an execution of a data access command is completed, the power management logic performing the power reduction enablement sequence at an adaptively selected rate that is related to a second predetermined value of elapsed time after the execution that calls for a switch to a reduced power mode for the apparatus.

2. The apparatus of claim 1 wherein at the adaptively selected rate the power reduction enablement sequence is completed before the call for the switch to the reduced power mode.

3. The apparatus of claim 1 wherein the adaptively selected rate is further related to an instantaneous status of the apparatus at a time substantially contemporaneous with the first predetermined value of elapsed time after the execution in comparison to a target status of the apparatus at a time substantially contemporaneous with the second predetermined value of elapsed time after the execution.

4. The apparatus of claim 1 wherein the power reduction enablement sequence is characterized by moving a data transfer member from a first position in an operable mode to a second position in the reduced power mode.

5. The apparatus of claim 4 wherein the adaptively selected rate is characterized by executing a model reference seek of the data transfer member.

6. The apparatus of claim 4 wherein the adaptively selected rate is characterized by executing a velocity controlled seek.

7. The apparatus of claim 4 wherein the adaptively selected rate imparts a substantially constant velocity to the data transfer member.

8. The apparatus of claim 3 wherein the status is associated with a position of a component that is moveable between one or more first positions in an operable mode and a second position in the reduced power consumption mode.

9. The apparatus of claim 8 wherein the adaptively selected rate moves the component from an instantaneous first position at a time substantially contemporaneous with the first predetermined value of elapsed time after the execution to the second position before the second predetermined value of elapsed time after the execution.

10. An apparatus comprising:
    command queue logic to control issuance of data access commands to a storage space via a data transfer member disposed in a data transfer relationship with the storage space; and
    power management logic to begin moving the data transfer member toward a parked location based on a first predetermined value of elapsed time after execution of a data access command, and the power management logic continuing to move the data transfer member at an adaptively selected velocity that is related to a second predetermined value of elapsed time after the execution associated with a call for a switch to a reduced power mode for the apparatus.

11. The apparatus of claim 10 wherein the power management logic moves the data transfer member to the parked location before the second predetermined value of elapsed time after the execution.

12. The apparatus of claim 10 wherein the parked position is characterized by biasing an actuator supporting the data transfer member against a crash stop.

13. The apparatus of claim 10 wherein the adaptively selected rate is further related to an instantaneous position of the data transfer member at a time contemporaneous with the first predetermined value of elapsed time after the execution.

14. The apparatus of claim 10 wherein the adaptively selected rate is characterized by executing a model reference seek.

15. A method comprising:
    monitoring an elapsed time after execution of a data access command in an apparatus;
    when an elapsed time after the execution is greater than a first predetermined threshold, executing programming instructions stored in a computer readable memory to begin performing a power reduction enablement sequence in the apparatus at an adaptively selected rate that is associated with a second predetermined threshold of elapsed time after the execution; and
    when an elapsed time is greater than the second predetermined threshold, further executing the instructions to switch to a reduced power mode for the apparatus.

16. The method of claim 15 wherein the adaptively selected rate is characterized by completing the power reduction enablement sequence before the switch to a reduced power mode step.

17. The method of claim 15 wherein the adaptively selected rate is further related to an instantaneous status of the apparatus at a time substantially contemporaneous with the first predetermined value of elapsed time after the execution in comparison to a target status of the apparatus at a time substantially contemporaneous with the second predetermined value of elapsed time after the execution.

18. The method of claim 15 wherein the power reduction enablement sequence is characterized by moving a data transfer member from a first position in an operable mode to a second position in the reduced power mode.

19. The method of claim 18 wherein the adaptively selected rate is characterized by executing a model reference seek of the data transfer member.

20. The method of claim 17 wherein the status is associated with a position of a component that is moveable between one or more first positions in an operable mode and a second position in the reduced power mode.

* * * * *